United States Patent
Michaud et al.

(10) Patent No.: US 10,260,140 B2
(45) Date of Patent: Apr. 16, 2019

(54) METHOD FOR INSPECTING AND PROCESSING HIGH HARDNESS ALLOY STEELS

(71) Applicant: REM Technologies, Inc., Southington, CT (US)

(72) Inventors: Mark D. Michaud, Austin, TX (US); Gary J. Sroka, Missouri City, TX (US); Lane Winklemann, New Ulm, TX (US)

(73) Assignee: REM Technologies, Inc., Southington, CT (US)

( * ) Notice: Subject to any disclaimer, the term of this patent is extended or adjusted under 35 U.S.C. 154(b) by 465 days.

(21) Appl. No.: 14/920,515

(22) Filed: Oct. 22, 2015

(65) Prior Publication Data

US 2016/0115579 A1  Apr. 28, 2016

Related U.S. Application Data (60) Provisional application No. 62/067,265, filed on Oct. 22, 2014.

(51) Int. Cl.
*C23C 8/40* (2006.01)
*C23C 22/46* (2006.01)
(Continued)

(52) U.S. Cl.
CPC .................. *C23C 8/40* (2013.01); *C09D 5/08* (2013.01); *C22C 38/002* (2013.01); *C22C 38/44* (2013.01);
(Continued)

(58) Field of Classification Search
CPC .......... C23C 22/46; C23C 22/73; C23C 22/77; C23C 8/40; C23F 3/00; C23F 3/06
(Continued)

(56) References Cited

U.S. PATENT DOCUMENTS 4,491,500 A  *  1/1985  Michaud .................. C23C 22/73
                                                            216/102
4,906,327 A       3/1990  Michaud et al.
(Continued)

FOREIGN PATENT DOCUMENTS

EP  0414441 A2  2/1991
EP  0414441 A3  2/1991
(Continued)

OTHER PUBLICATIONS

Moorthy, V., and B. A. Shaw. "Magnetic Barkhausen emission measurements for evaluation of material properties in gears," pp. 1-51.
(Continued)

*Primary Examiner* — Matthew E. Hoban
*Assistant Examiner* — Nicholas A Wang
(74) *Attorney, Agent, or Firm* — Jones Walker LLP (57) ABSTRACT

A highly reactive conversion coating chemistry is used during CAVF processing of high hardness steel alloys such as AMS 6509 and AMS 6517 steel alloys. This chemistry produces a hard, thin, black conversion coating that is not fully rubbed off by the media during the CAVF process. Distressed material regions on the surface of the alloys are not susceptible to forming the conversion coating and remain white. Visual inspection for the presence of such regions is facilitated.

16 Claims, 3 Drawing Sheets

(51) Int. Cl.

| | |
|---|---|
| *C23C 22/73* | (2006.01) |
| *C23C 22/77* | (2006.01) |
| *C23F 3/00* | (2006.01) |
| *C09D 5/08* | (2006.01) |
| *C22C 38/00* | (2006.01) |
| *C22C 38/44* | (2006.01) |
| *C22C 38/52* | (2006.01) |
| *C22C 38/56* | (2006.01) |
| *C23F 3/06* | (2006.01) |

(52) U.S. Cl.
CPC .............. *C22C 38/52* (2013.01); *C22C 38/56* (2013.01); *C23C 22/46* (2013.01); *C23C 22/73* (2013.01); *C23C 22/77* (2013.01); *C23F 3/00* (2013.01); *C23F 3/06* (2013.01)

(58) Field of Classification Search
USPC .................................................. 148/240, 280
See application file for complete search history.

(56) References Cited

U.S. PATENT DOCUMENTS

| | | | |
|---|---|---|---|
| 7,229,565 B2* | 6/2007 | Jaworowski | ............ B24B 31/00 |
| | | | 216/52 |
| 7,641,744 B2 | 1/2010 | Winkelmann | |
| 2009/0223052 A1 | 9/2009 | Chaudhry | |
| 2010/0233510 A1* | 9/2010 | Sroka | ........................ B24B 5/00 |
| | | | 428/687 |

FOREIGN PATENT DOCUMENTS

| | | | |
|---|---|---|---|
| WO | 99/39017 A1 | 8/1999 | |
| WO | 2009/032221 A1 | 3/2009 | |

OTHER PUBLICATIONS

Conversion Coating informational, 1 page.
Winkelmann, Lane, Omer El Saeed, and Matt Bell. "The Capacity of Superfinished Vehicle Components to Increase Fuel Economy." ASME 2007 International Design Engineering Technical Conferences and Computers and Information in Engineering Conference. American Society of Mechanical Engineers, 2007.
EPO Application No. 15191065.0—Extended European Search Report dated Feb. 18, 2016.
Debold, T. and Martin, J. "How to Passivate Stainless Steel Parts," Caprenter Technical Articles (Oct. 2003), 7 pages.
Samuels, L. E. "Mechanical Grinding, Abrasion, and Polishing," Metallographic Techniques, pp. 33-39.
"Comparison of Depth of Surface Integrity Effects Observed in Material Removal Processes (Table 1-4)," Surface Integrity—Chapter 1.
Handout, "A Winning Finish—REM's New Black Technology Gives High Performance Motorsports the Competitive Edge".
Hansen, B et al., "Isotropic Supertinishing of S-76 Main Transmission Gears," REM Chemicals, Inc. (2003), 31 pages.
Sroka, Gary J., and L. Winkleman. "Superfinsihing gears—the state of the art." Gear Technology 20.6 (2003), pp. 28-33.
Sroka, Gary J., and L. Winkleman. "Superfinsihing gears—the state of the art, part II." Gear Technology (2005), pp. 30-32.
Warren, A. and Guo, Y. "Suface Hardening," Gear Solutions (2007), pp. 44-56.
Koster, William P. "Surface Integrity: An Emerging Criterion for Quality Assurance," Society of Manufacturing Engineers (1976), vol. IQ76-926, 10 pages.
Stowe, John. "The Ultimate Finish," Insight: REM Superfinishing, 8 pages.
"Counters EDM "White" Layer Effect," retrieved from http://www.badgermetal.com/ml-edm-counter.htm on May 6, 2014, 1 page.
"Yield Strength and Heat Treatment," retrieved from http://www.tppinfo.com/defect_analysis/yield_strength.html on Jul. 9, 2014, 7 pages.

* cited by examiner

METHOD FOR INSPECTING AND PROCESSING HIGH HARDNESS ALLOY STEELS

RELATED APPLICATION DATA

The present application claims priority from U.S. provisional application No. 62/067,265 filed on 22 Oct. 2014, the contents of which is incorporated herein by reference in its entirety.

FIELD

The present invention relates to a method of inspection for distressed surface layers on certain high hardness alloy steels, especially AMS 6509 and AMS 6517.

Furthermore, the invention relates to a method of removal of these distressed surface layers via a planarizing process such that the final surface is visually free of surface distress and said surface achieves the metal to metal contact durability performance the alloy was designed for. Specifically, the invention relates to a method of inspection for surface temper burn.

Moreover, the invention relates to a liquid chemical solution for use in such methods and the use of such a liquid chemical solution.

BACKGROUND

AMS 6509 and AMS 6517 are high hardness, temper resistant alloy steels designed for use in metal to metal contact applications such as, but not limited to, gears, bearings and shafts. Due to their high hardness after heat treatment (HRC 60-64), any metal to metal contact surface must be very smooth so that the designed for surface durability performance of the metal to metal contacts can be achieved, especially if the AMS 6509 or AMS 6517 is mated to a lower hardness alloy component.

Typically, AMS 6509 and AMS 6517 are machined after heat treatment to produce the necessary final dimensions and geometry of the metal to metal contact surfaces. Machining techniques such as, but not limited to, turning, broaching, grinding, skiving or honing can be employed to produce these metal to metal contact surfaces. Because of some of the material properties of AMS 6509 and AMS 6517, such as the high surface hardness after heat treatment, these alloys are susceptible during grinding or other surface machining process, to forming a distressed material layer consisting of one or all of the following:

a) White layer, which is a brittle, hard surface layer prone to cracking. This is material that has been melted and rapidly solidified. The white layer is densely infiltrated with carbon and has a distinct separate structure to that of the parent metal. The amount of white layer can be the general machined surface area or it can be small, isolated areas of the machined surface. White layer is typically very thin from machining operations, often on the order of 1-4 microns deep. White layer is typically discontinuous in that it is intermixed with non-distressed metal.

b) Strain hardened surface zone whereby the metal undergoes changes in its atomic and crystalline structure, resulting in increasing resistance of the metal to further deformation. The strain hardened surface zone is higher in hardness than the surrounding area. The amount of strain hardened zone can be the general machined surface area or it can be small, isolated areas of the machined surface. Strain hardening from machining operations is typically very thin, often on the order of 1-4 microns deep. Strain hardened surface zones are typically discontinuous in that they are intermixed with non-distressed metal.

c) Oxidization resistant material zone whereby the machined surface is in a conversion coating reaction inert condition. The amount of oxidization resistant surface area can be the general machined surface or it can be small, isolated areas of the machined surface. The oxidization resistant material layer is typically very thin, often on the order of 1-4 microns deep. Oxidization resistant material transformed zones are typically discontinuous in that they are intermixed with non-distressed metal.

d) Temper burnt surface zone (also referred to as grind burn), is a soft layer caused by the alloy being heated above its tempering temperature and then slowly cooled. Temper burn is generally a large area and not small, isolated areas of the machined surface. Temper burn is generally deeper than the other three types of distressed layers, often on the order of 10-50 microns deep. Temper burn is typically continuous across the burnt zone and is not intermixed with non-distressed metal. Temper burn is considered to be a severe material degradation that often required the scrapping of the component.

In the following, reference to susceptible high-hardness steel components is intended to denote components having surface hardness of greater than 60 HRC and which are susceptible to one or all of the above referenced distress conditions.

After final machining, components made of these AMS 6509 and AMS 6517 alloys often require inspection to confirm they are free of temper burn before they can be put into operation. Unfortunately, it has been found that traditional temper burn inspection techniques, such as 4% nitric acid in ethyl alcohol etch (Nital Etch), do not accurately predict the presence of temper burn on these alloys. An alternative method of temper burn inspection etching using 50% hydrochloric acid in water at 160° F. for 30 minutes has been developed. This alternative method is environmentally and health disadvantageous and does not always produce accurate predictions of the presence of temper burn.

It is believed that for accurate temper burn inspection of AMS 6509 and AMS 6517 via 4% nitric/alcohol etch or via 50% hydrochloric/water etch, or by other methods such as Barkhausen, the white layer, strain hardening layer, and/or the oxidization resistant material layer must be removed. It is also believed that the presence of a white layer, a strain hardened layer and/or an oxidization resistant material layer, if left on the surface by themselves, will reduce the surface durability performance in metal to metal contact components when put into operation.

DESCRIPTION OF RELATED ART

Chemically Accelerated Vibratory Finishing (CAVF) is a well-known method for the refinement of machined metal surfaces via a planarizing mechanism. This planarizing mechanism uses active chemistry to produce soft conversion coatings in mass finishing systems such as, but not limited to, vibratory bowls, vibratory tubs, tumbling barrels, disc machines and drag finishing machines.

Existing CAVF methods utilize non-abrasive or abrasive ceramic media or metal or plastic media to rub the surface of metal components in the mass finishing system. The rubbing action of the media removes the soft conversion coating from the projecting areas of the surfaces being finished such as the peaks of grinding asperities, exposing the base metal. The conversion coating in the valleys of the ground surfaces remains undisturbed by the rubbing action. The exposed metal on the peaks of the grinding asperities reacts again with the active chemistry, reforms the conversion coating, only to be removed again by the ongoing rubbing action of the media in the operating mass finishing system. In this fashion, the repeated reforming and removal of the conversion coating results in a "planarizing mechanism". If this planarizing mechanism is carried out long enough, the projecting surfaces are removed down to the bottom of the valleys of the ground surface, flattening the machined surface to a smooth, low Ra condition. When the machined surface has been planarized to the point where all machining marks have been removed, the surface is said to be isotropic and superfinished to Ra≤0.25 microns, preferably to Ra≤0.1 micron, most preferably to Ra≤0.05 micron.

It has always been thought that the planarizing mechanism of CAVF was dependent upon the conversion coating being substantially soft such that non-abrasive media could completely rub through the coating to expose the base metal to further conversion coating reactions. It was further believed that the conversion coating was self-limiting in that surface reaction would stop once the coating had built up sufficient thickness to act as a barrier to further reaction. It was generally thought that only when the non-abrasive media had completely rubbed through an area of the surface to expose the base metal to induce additional conversion coating reactions that the refinement mechanism was correctly working. It was also generally thought that any conversion coating that was too hard for the non-abrasive media to rub off and not expose the base metal was not resulting in any metal removal and thus not refining or planarizing the surface.

On typical hardened steel alloys such as 9310 (AMS 6260), or 4140 (AMS 6349), traditional conversion coating chemistries produce a soft, dull dark conversion coating that is easily rubbed off to the base steel metal by the media rubbing action. The planarizing mechanism is readily confirmed during CAVF processing of these metals by observing areas of base metal exposed by the rubbing action of the media and coated areas of conversion coating. On ground hardened steel surfaces, the process develops the appearance of bas relief pattern with dull dark conversion coating in the valleys of residual grind lines and semi-coated plateaus of exposed base metal and conversion coated metal. In this context, it is noted that the conversion coating encountered in conventional CAVF processes has a hardness on Moh's scale of mineral hardness of around 3 or 4, being around the hardness range of brass or aluminum.

Initial attempts to utilize traditional CAVF processes to refine the surfaces of AMS 6509 and AMS 6517 have proven unsuccessful. AMS 6509 and AMS 6517 are easily etched in traditional CAVF conversion coating active chemistries and produce unsatisfactory finishes for metal to metal contact components.

However, during the testing of the traditional CAVF conversion coating active chemistries on AMS 6509 and AMS 6517, it has been noted that the surface reactions are inconsistent across the machined surfaces. Some areas of the surfaces remained free of conversion coating while other areas developed a soft conversion coating. Normally, CAVF processes produce a consistent conversion coating reaction across all wetted hardened steel surfaces. Hardened AMS 6509 and AMS 6517 surfaces reacted inconsistently to the traditional CAVF chemistries.

Without wishing to be bound by theory, it is believed that this abnormal surface reaction condition may be a result of non-reactive distressed layers such as white layer, strain hardening and/or oxidization resistant material zones on areas of machined AMS 6509 and AMS 6517. It might also be concluded that these distressed layers are preventing accurate temper burn surface inspection analysis by 4% alcohol etch, 50% water etch and/or Barkhausen analysis. It was considered that these distressed layers might need to be removed such that a smooth isotropic superfinished surface could be produced and so that AMS 6509 and AMS 6517 could achieve their intended surface durability performance. It was also considered that these distressed layers might be removed such that AMS 6509 and AMS 6517 could be accurately inspected for temper burn by the above inspection methods.

SUMMARY OF THE INVENTION

According to the invention, there is disclosed a method for indicating the presence of regions of distressed material on a surface of a high-hardness steel component, the method comprising: providing a mass finishing machine having a receptacle containing a quantity of media; supplying to the receptacle a quantity of a liquid chemical solution capable of forming a hard, black conversion coating on parts of the surface that are not distressed; immersing the component at least partially in the media such that the surface is exposed to the liquid chemical solution; and processing the component by inducing movement between the surface and the media in order to continuously form and reform the conversion coating on parts of the surface where distressed material is absent and wherein the conversion coating is not formed on parts of the surface where distressed material is present.

In one embodiment the media is selected from the group consisting of: non-abrasive media; abrasive media; plastic media; and stainless-steel media.

In another embodiment, the liquid chemical solution is acid based, preferably including oxalic radicals.

In a further embodiment, the liquid chemical solution comprises a thiocyanate salt or isothiocyanate salt, preferably sodium thiocyanate or sodium isothiocyanate.

According to one aspect, the method may be carried out in a receptacle comprising a vibratory bowl. The liquid chemical solution may be introduced into the receptacle at a controlled flow rate of about 0.05 to 0.5 liter per hour per liter of receptacle volume, preferably 0.1 liter per hour per liter of receptacle volume.

According to one embodiment of the method, the hard, black conversion coating produced may be between 0.1 to 10 microns thick, optionally between 0.2 to 2.0 microns thick, preferably about 1 micron thick. It may also have a hardness of greater than 5 on Moh's Mineral Hardness test scale.

According to a still further embodiment the hard, black conversion coating may comprise an oxalate, in particular with a predominance of iron (III) oxalate.

In one aspect, performance of the method may cause the parts of the surface where distressed material is present to appear as a contrasting color to that of the hard, black conversion coating, preferably white or silver.

The method according to the invention may, in certain embodiments, further comprise inspecting the surface by observing the portion of the surface provided with the conversion coating and the portion of the surface without the conversion coating.

Without wishing to be bound by theory, the method is believed to be applicable in cases where the distressed material comprises at least one of: a white layer, a strain hardened surface zone; an oxidization resistant material zone; and a temper burnt surface zone. It may also be observed that the portion of the surface without the conversion coating has a higher surface hardness than the portion of the surface with the conversion coating.

The method may be carried out until a desired result is achieved. In one embodiment, this may comprise processing the component until the parts of the surface where distressed material is absent have been removed to below the level of parts of the surface where distressed material is present, whereby the distressed material is undermined and subsequently removed by action of the media. Processing of the component may also continue until no distressed material remains and the surface is uniformly covered with the conversion coating. Alternatively, processing the surface may continue until a surface roughness Ra of the surface is less than 0.25 micron, alternatively less than 0.1 micron, alternatively less than 0.05 micron.

In one embodiment, after terminating the processing of the component, the conversion coating may be subsequently removed. Alternatively, the conversion coating may be retained. The method may even comprise impregnating the conversion coating with a corrosion preventive substance.

Furthermore, the method may also comprise performing a test for the presence of temper burn, with or without prior removal of the conversion coating.

As described above, the method is highly effective as a test in identifying areas of distressed material on the surface of a component that has been surface finished in a conventional superfinishing operation. According to one aspect of the invention, prior to carrying out the method to test the surface for distressed material, the method may comprise finishing of the surface to a surface roughness Ra of the surface of less than 0.25 micron, alternatively less than 0.1 micron, alternatively less than 0.05 micron, optionally by a process selected from the group comprising: CAVF using non-abrasive or abrasive media, drag-finishing, spindle deburring, centrifugal disc processing, abrasive media tumbling, loose abrasive tumbling, ABRAL™ processes, abrasive paste based processes and micro-abrasive combined with metal media processes.

The method is particularly applicable to high-hardness steel components comprising a steel alloy comprising one or more or all of the following:
  0.1 to 0.15 weight percent carbon
  16 to 18 weight percent cobalt,
  7.5 to 9.5 percent weight percent nickel,
  about 3.5 weight percent chromium,
  1.0 to 2.0 weight percent molybdenum,
  up to 0.25 weight percent tungsten,
  up to 0.02 weight percent vanadium;
with the balance being iron.

The high-hardness steel component may in particular comprise a steel alloy that is case hardened in the range of surface hardness greater than 60 HRC, optionally in the range from 60 HRC to 65 HRC.

The invention also relates to a high-hardness steel component having a surface provided with a hard, black, shiny conversion coating as described above and hereinafter. The high-hardness steel component may be processed according to any of the above described methods and may be any component including, but not limited to: a gear, a bearing, a shaft, a journal, a cam, a piston, an axle, a seat or a seal.

In one embodiment, the conversion coating on the component may be between 0.5 microns and 2 microns in thickness and/or have a hardness of greater than 5 on Moh's Mineral Hardness test scale.

The coating may be uniform across the whole surface of the component or may be present on a first part of the surface and absent on further parts of the surface where distressed material is present. According to one particular embodiment the further parts of the surface may have a contrasting color or appearance to the hard, black, shiny conversion coating. This is particularly advantageous for visible testing.

The invention also relates to a liquid chemical solution for use in the methods described. In one embodiment, the solution may comprise:
  0.6 to 10.5 v/v % of oxalic acid;
  0.0003 to 1.0 v/v % of sodium thiocyanate;
  0 to 3.0 v/v % of sodium metal nitrobenzene sulfonate (SMNBS);
  0.0001 to 0.5 v/v % of a surfactant;
with the balance being water.

In another embodiment, the liquid chemical solution may comprise:
  0.8 to 1.2 v/v % of oxalic acid;
  0.0005 to 0.002 v/v % of sodium thiocyanate;
  0.010 to 0.02 v/v % of SMNBS;
  0.0005 to 0.02 v/v % of the surfactant;
with the balance being water.

In a still further embodiment, the liquid chemical solution may consist of:
  0.6 to 10.5 v/v % of oxalic acid;
  0.0003 to 1.0 v/v % of sodium thiocyanate;
  0.0001 to 0.5 v/v % of a surfactant;
with the balance being water.

The invention also relates to the use of a liquid chemical solution as described above or hereinafter in the chemically accelerated vibratory finishing of a ground, high-hardness steel component.

Still further, the invention relates to the use of a liquid chemical solution as described above or hereinafter in the inspection of a mechanically superfinished, high-hardness steel component for the presence of distressed material regions. In particular, the high-hardness steel component may be a ground component. According to an aspect of the method, the solution forms a hard, shiny, black conversion coating on regions that are not distressed and a white layer on those areas that are distressed.

The invention also relates to a method of exposing and removing distressed metal, including white layer, strain hardened and/or oxidization resistant material zones, from hardened steel surfaces using CAVF substantially as herein disclosed and similarly a method for preparing a surface for temper burn inspection comprising performing CAVF substantially as herein disclosed.

Furthermore, there is disclosed a method of finishing high-hardness steel components comprising performing a pre-finishing process to remove distressed material layers and subsequently performing a CAVF process substantially as hereinbefore described to form a thin, hard shiny black conversion coating to verify the removal of the distressed layers.

A highly reactive conversion coating chemistry that produces a thin, hard shiny black conversion coating was developed and applied to the CAVF processing of AMS 6509 and AMS 6517. This highly reactive chemistry produces an extremely hard, thin, black conversion coating that is not fully rubbed off by the non-abrasive media during the later refinement stage of the CAVF process. In appearance, once the surfaces of AMS 6509 and AMS 6517 are isotropic superfinished, no base metal appears to be exposed by the non-abrasive media rubbing action. Yet it has been shown that metal removal continues despite this continuous thin hard shiny black conversion coating, so long as the CAVF process is continued, even after an isotropic superfinish has been achieved.

The hardness of this thin, black coating is greater than 5 on Moh's test scale of Mineral Hardness. This approximates to around HRC 38. The thickness of this thin, hard shiny black coating is approximately 1 micron as measured by coating weight per surface area analysis. One highly reactive chemistry that produces this thin, hard shiny black conversion coating is based on a composition comprising oxalic acid with (iso) thiocyanate salts. The conversion coating may be between 0.1 to 10 microns thick, optionally between 0.2 to 2.0 microns thick, preferably about 1 micron thick. The hard, thin shiny black conversion coating is actually polished and appears shiny throughout the later stages of the CAVF process once a majority of the surface machining marks has been removed. Once all machining marks have been removed, the surfaces of AMS 6509 and AMS 6517 components are a continuous shiny black color. On the Tiffen Grey Scale, the color is 15-17 when visually inspected under white light at a minimum of 500 LUX.

The conversion coating chemistry does not visibly react with white layer; strain hardened layer; and/or oxidization resistant material layer. During CAVF processing of AMS 6509 and AMS 6517 using this hard shiny black conversion coating chemistry, these distressed layers remain free of conversion coating. However, since these distressed surface layers are typically discontinuous and intermixed with non-distressed metal, the CAVF process conversion coating develops in the non-distressed metal surface areas. As these non-distressed areas become planarized, the adjacent non-reactive distressed layer areas become raised upwards above the planarized regions. Eventually, the non-abrasive media rubbing action of the CAVF process breaks away these upward projecting, non-reactive distressed layer areas and a pure surface is developed, free of white layer, strain hardened zones and/or oxidization resistant material zones. Only temper burnt distressed areas, if any are present, are too deep, continuous and inert to the thin, hard shiny conversion coating chemistry to be broken free or removed by the non-abrasive media action. Temper burnt areas will remain as continuous, shiny silver metal surrounded by continuous shiny black metal.

During the CAVF processing of AMS 6509 and AMS 6517, the machined surfaces develop the dark conversion coating on the non-distressed metal areas first while the non-reactive distressed areas remain white or silver in appearance. As the CAVF process progresses, these white or silver colored distressed metal areas rise upward above the adjacent shiny black conversion coated planarized areas and break away due to the rubbing action of the non-abrasive media.

Once the distressed layers are broken away, the exposed metal is reactive to the conversion coating chemistry and the planarized surface area grows as a percentage of the entire surface. Since the thin, hard shiny conversion coated areas are 15-17 on the Tiffen Gray Scale, it is easy to inspect for residual distressed surface metal during processing, either visually or using low magnification (20×), under 500 LUX white light. The residual non-reactive surface distressed metal is white or silver colored surrounded by shiny black conversion coating.

The CAVF process is continued until no white or silver distressed metal remains under visible or 20× inspection. At this point, the machined surfaces of AMS 6509 and AMS 6517 are free of white layer, strain hardened zones and/or oxidization resistant material transformed zones. Only temper burnt zones will remain, if present, as visible continuous shiny silver metal. The planarized surfaces of the AMS 6509 and AMS 6517 are isotropic, superfinished to Ra≤0.1 microns and suitable for metal to metal contact systems to the specified surface durability performance.

Thus a method to expose, inspect for, and remove distressed metal such as white layer, strain hardened zones and/or oxidization resistant material zones from hardened machined surfaces has been developed for AMS 6509 and AMS 6517. Said method produces a planarized isotropic superfinish on hardened machined surfaces suitable for metal to metal contact systems such that the designed for surface durability performance is achieved. Said method produces a black, planarized surface except for temper burnt zones, which cannot be removed by said process and remain shiny silver colored. Thus, said process clearly exposes temper burn for inspection. Similarly, once the process has been carried out such that distressed metal in the form of white layer, strain hardened zones and/or oxidization resistant material transformed zones have been removed, secondary temper burn inspection techniques such as 4% nitric acid/alcohol, 50% HCL/water and/or Barkhausen analysis can be accurately carried out on the AMS 6509 and AMS 6517. Such secondary inspection techniques may take place with or without prior removal of the conversion coating.

It must be understood that alternative surface finishing techniques such as any micro abrasive polishing process, electropolishing process, or low reactivity CAVF processing (i.e. low reactivity chemistry that does not produce visible conversion coatings) may be suitable for refining the surfaces of AMS 6509 and AMS 6517 to remove white layer, strain hardened zones and/or oxidization resistant material transformed zones. These may be followed by a short CAVF process using the present process and chemistry to form the thin hard shiny black conversion coating. This latter process allows the user to verify visually the removal of these distressed layers, or to remove any residual distressed layers (after the pre-finishing processing) and/or for preparation for accurate inspection of temper burn directly from the CAVF process or by secondary acid etch inspection processes.

The CAVF process may be carried out in an otherwise conventional manner in a vibratory bowl or tub or suitable mass finishing system such as a drag finisher or disc machine using any appropriate media. In general, non-abrasive ceramic media may give best results. Nevertheless abrasive media may also be used, which may be chosen to have abrasive particulates that polish but do not substantially remove the hard, black, shiny conversion coating. Plastic and metal media, particularly stainless steel media, may also be used. Additionally, induced movement of the component through the media may be provided in order to provide shorter processing times, as described in co-pending U.S. application Ser. No. 12/620,231, the contents of which are incorporated herein by reference in their entirety.

The conversion coating chemistry may be loaded in the machine or supplied to the vibratory machine on a flow through basis (i.e. with an open drain in the vibratory machine and the liquid product metered into the machine at a controlled flow rate). The flow rate may be the minimum needed to maintain the machine in a "wetted" condition such that the conversion coating reaction is maintained on the components being processed. If many parts (large surface area) are loaded into the vibratory machine, more liquid flow rate may be needed to maintain the conversion coating reaction. Inversely, the machine should not run dry, as there would then be no reaction. The liquid chemical solution may be introduced into the receptacle at a controlled flow rate of about 0.05 to 0.5 liter per hour per liter of receptacle volume. A typical flow rate may be 0.1 liters of product per hour for each liter of vibratory machine volume i.e. a 300 liter vibratory bowl may require around 30 l/hr of product.

An exemplary working range for the liquid chemical solution used as the conversion coating chemistry is:
Water 99.3996-85 v/v %
Oxalic acid*0.6-10.5 v/v %
Sodium Metal Nitrobenzene Sulfonate (SMNBS) 0-3 v/v %
Sodium (iso)Thiocyanate 0.0003 v/v %-1 v/v %
Surfactant 0.0001 v/v %-0.5 v/v %

In one embodiment the conversion coating chemistry comprises:
Oxalic acid 1.0 v/v % (accuracy+/−10%)
Sodium Meta Nitrobenzene Sulfonate 0.015 v/v % (accuracy+/−10%)
Sodium Thiocyanate 0.001 v/v % (accuracy+/−10%)
Surfactant 0.01 v/v % (accuracy+/−10%)
The remainder being water.

The skilled person will understand that these compositions are exemplary and that minor variations to the above chemistries that lead to the same or similar conversion coatings are to be considered equivalent to the above. In particular, solutions in which the oxalic acid is partially replaced by citric acid, phosphoric acid or other similar acids are considered to fall under the above definition. In particular, in the context of CAVF processes the above mentioned concentration of at least 0.6 v/v % oxalic acid may be considered a relatively strong solution. Nevertheless, still higher concentrations have been found to work most adequately in forming the claimed hard, black, shiny conversion coating. Furthermore, solutions in which the SMNBS is effectively absent or is present at less than 0.0001 v/v % are hereby explicitly included.

The temperature range for operation may be typical for mass finishing processing: 18° C.-45° C.

One preferred ingredient in producing the hard shiny black conversion coating and in highlighting the distressed metal layer that eventually is worn away to a pure surface is the sodium (iso) thiocyanate. Without the sodium (iso) thiocyanate, the surface may etch and the chemistry may not effectively remove the distressed layer. The skilled person will appreciate that other sulfur-containing ingredients may be utilized including other thiocyanate salts. In addition or alternatively to the sodium salt, thiourea, dithiocarbamate salts, and tetramethylthiuram monosulfide may also be employed. The concentrations of the several sulfur-containing compounds, which will be effective without engendering pitting or other problems (such as odor), will vary depending upon the compound employed, and appropriate proportions and concentrations have been indicated hereinabove.

In general, it is not a requirement to fully remove the conversion coating, exposing the base metal, to successfully achieve a planarizing mechanism. In fact, it has been found that by not fully rubbing off the conversion coating, the etching problem may be eliminated in susceptible steel alloys such as AMS 6509 and AMS 6517. Furthermore, it is not necessarily a requirement to remove the hard black shiny conversion coating on completion of the process. As this layer is of high hardness but nevertheless softer than the metal layer beneath, it may be left on the surface of the component prior to or even during operation and may function as a dry film lubricant. In certain circumstances, dry film lubricants are imperative and the presently disclosed process and product may fulfil this additional requirement. The skilled person will understand that in the event that the conversion coating is required for this purpose, it may be further optimized by the addition of appropriate compounds to the liquid chemical solution or by impregnating the coating after completion of the finishing process. Should it be required, the conversion coating may also be impregnated or otherwise provided with a suitable corrosion preventative for extended storage.

The process is applicable to any component that is made of a high-hardness alloy steel and that can be subjected to the above-described finishing and/or inspection process. In particular, it will be applicable to components having critical surfaces that must be isotropic superfinished in order to achieve their operating requirements. Components finished according to the present invention may include but are not limited to gears, bearings, shafts, journals, cams, pistons, axles, seats and seals. The process is particularly applicable to such components that have been machined by turning, broaching, grinding, skiving or honing or other similar processes that lead to the presence of distressed metal regions. In particular such machining processes may lead to grind lines or the like which can be removed either by a CAVF process or by another pre-finishing process or both.

DESCRIPTION OF THE FIGURES

Figure 1:
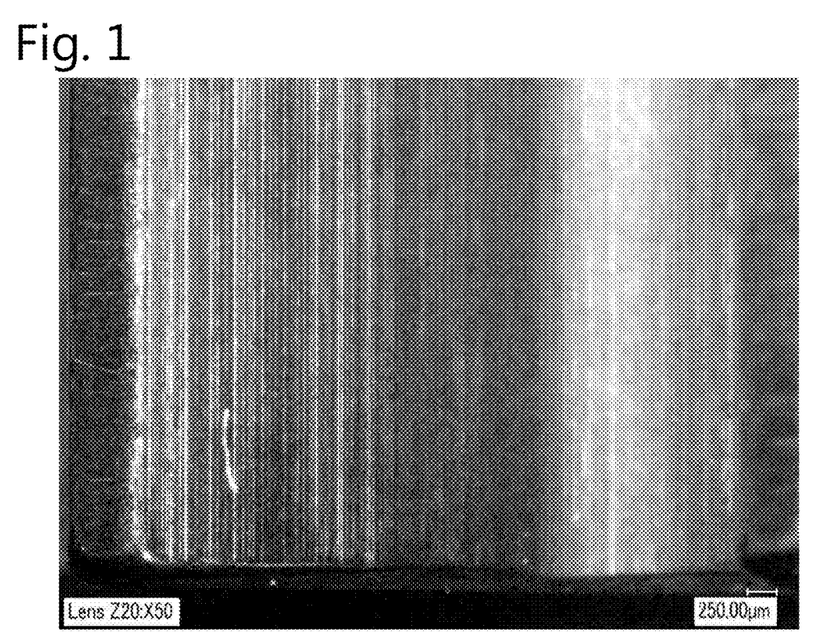

FIG. 1 shows a photograph of an AMS 6509 high-hardness steel component that has been processed by CAVF for 1 hour. The conversion coating chemistry comprises an aqueous solution with 1.0 v/v % oxalic acid, 0.015 v/v % SMNBS, 0.001 v/v % sodium thiocyanate and 0.01 v/v % surfactant.

The component was processed in a vibratory bowl having a volume of 100 liters, the bowl comprising non-abrasive ceramic media. The conversion coating chemistry was supplied to the vibratory bowl with a flow rate of 0.1 l/hr per liter of vibratory bowl volume, amounting to a flow rate of 10 l/hr of conversion coating chemistry.

After one hour of processing, the surface of the component shows the dark conversion coating on the non-distressed metal areas, while white lines indicate the distressed areas. These non-reactive white lines are valleys that are not reacting with the conversion coating chemistry of the CAVF process. These non-reactive areas shown as white or silver comprise distressed material such as white layer, strain hardened zones and/or oxidization resistant material zones.

Figure 2:
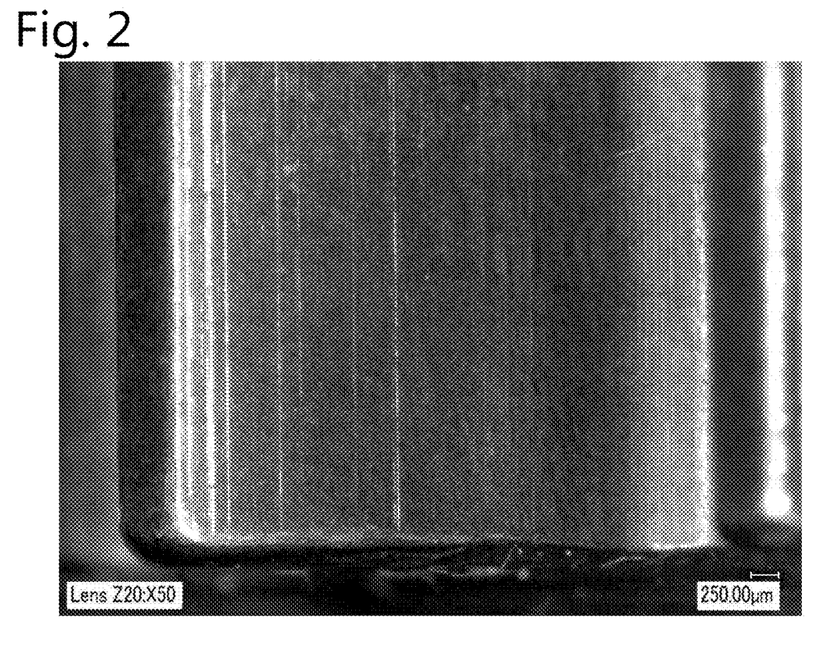

FIG. 2 shows a photograph of the AMS 6509 high-hardness steel component of FIG. 1, but now after 3 hours of processing by CAVF as described. The amount of surface covered with the dark conversion coating has increased, while the number of non-reactive white lines has decreased but intensified. As the CAVF process progresses, these white colored distressed areas rise upward above the adjacent shiny black conversion coated planarized areas and break away due to the rubbing action of the non-abrasive media.

Figure 3:
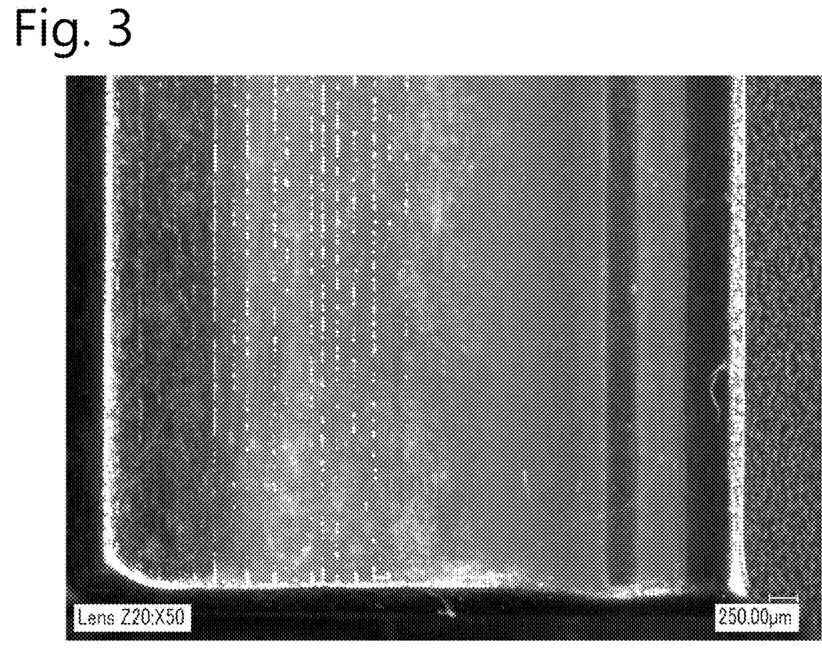

FIG. 3 shows a photograph of the AMS 6509 high-hardness steel component of FIGS. 1 and 2, but now after 6 hours of processing by CAVF as described. The surface is now covered with the thin, hard dark conversion coating and some residual non-reactive white lines. These residual white lines are now discontinuous or broken due to the partial breaking away of the non-reactive material during processing. The portion of the non-reactive white lines that remain visible are proud i.e. raised with respect to the surrounding material.

Figure 4:
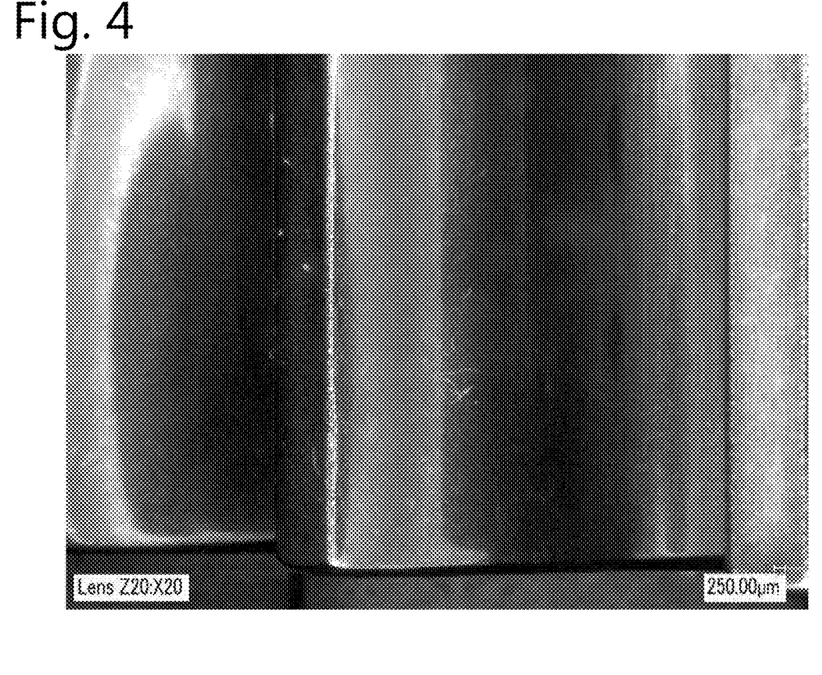

FIG. 4 shows a photograph of the AMS 6509 high-hardness steel component of FIGS. 1 to 3, but now after 8 hours of processing by CAVF as described above. At this stage of the processing, the surfaces of the AMS 6509 component are fully free of the white lines and it may be concluded that there is no residual non-reactive material remaining. At this point, the process is complete in that all the distressed layer(s) have been removed. The AMS 6509 component can now undergo a secondary etch inspection process to check for temper burn, should this be required. However, it is believed that the presence of a continuous conversion coating demonstrates not only the absence or removal of the non-reactive white distressed layer but also the absence of temper burn. As such, the present invention can act as a method for inspection for temper burn.

Figure 5:
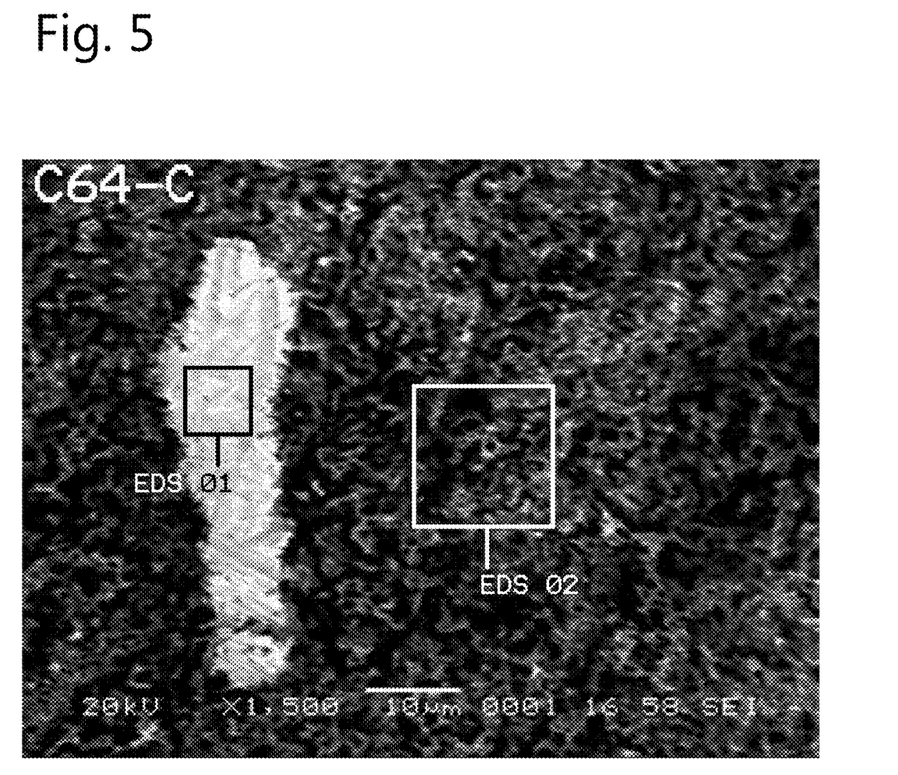

FIG. 5 shows an SEM picture of a non-reactive white zone (EDS01) and an adjacent area of the dark conversion coating (EDS02). The EDS (Energy-dispersive X-ray spectroscopy) results are shown in Table 1. The EDS analysis of the white spots versus the surrounding material revealed consistent results. In all areas, the dark surface had higher chromium, molybdenum and oxygen content, suggesting a probable complex passivating oxide layer. The base metal elements beneath the oxide layer are also detected. In the non-reactive white areas, only base metal elements are detected, indicating no reaction by the chemical conversion process.

TABLE 1

EDS results showing the weight percent of each measured element present in EDS 01 and EDS 02 as shown in FIG. 5.

| Element | Weight Percent Present | |
|---|---|---|
| | EDS 01 | EDS 02 |
| Carbon | 0.8 | 3.2 |
| Oxygen | — | 3.2 |
| Chromium | 2.9 | 3.8 |
| Iron | 69.3 | 61.8 |
| Cobalt | 16.3 | 14.8 |
| Nickel | 7.0 | 6.8 |
| Molybdenum | 2.6 | 5.5 |
| Tungsten | 1.0 | 0.9 |

Thus, the invention has been described by reference to certain embodiments discussed above. It will be recognized that many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. Method for indicating the presence of regions of distressed material on a surface of a steel component having a surface hardness greater than 60 HRC, the method comprising:
    providing a mass finishing machine having a receptacle containing a quantity of media
    supplying to the receptacle a quantity of an acid based liquid chemical solution for forming a black conversion coating on parts of the surface that are not distressed, the black conversion coating having a hardness of greater than 5 on the Mohs' hardness scale, wherein the conversion coating is not formed on parts of the surface where distressed material is present;
    immersing the component at least partially in the media such that the surface is exposed to the liquid chemical solution; and
    processing the component by inducing movement between the surface and the media thereby forming the conversion coating on parts of the surface where distressed material is absent.

2. Method according to claim 1, wherein the liquid chemical solution includes oxalic radicals.

3. Method according to claim 1, wherein the liquid chemical solution comprises a thiocyanate salt or isothiocyanate salt.

4. Method according to claim 1, wherein the conversion coating comprises an oxalate, with a predominance of iron (III) oxalate.

5. Method according to claim 1, further comprising inspecting the surface by observing the portion of the surface provided with the conversion coating and the portion of the surface without the conversion coating.

6. Method according to claim 1, comprising processing the component until the parts of the surface where distressed material is absent have been removed to below the level of parts of the surface where distressed material is present, whereby the distressed material is undermined and subsequently removed by action of the media.

7. Method according to claim 1, comprising processing the component until no distressed material remains and the surface is uniformly covered with the conversion coating.

8. Method according to claim 1, comprising processing the surface until a surface roughness Ra of the surface is less than 0.25 micron.

9. Method according to claim 1, comprising terminating the processing of the component and subsequently removing the conversion coating.

10. Method according to claim 1, further comprising performing a test for the presence of temper burn, with or without prior removal of the conversion coating.

11. Method according to claim 1, wherein the method comprises exposing and removing distressed metal, including white layer, strain hardened and/or oxidization resistant material zones, from hardened steel surfaces.

12. Method according to claim 1, wherein the method comprises preparing a surface for temper burn inspection.

13. Method according to claim 1, wherein the method comprises finishing steel components having surface hardness of greater than 60 HRC by performing a pre-finishing process to remove distressed material layers and subsequently followed by the steps of claim 1 to form a black conversion coating having a hardness of greater than 5 on the Mohs' hardness scale, to verify the removal of the distressed layers.

14. Method according claim 1, wherein the steel component comprises a steel alloy comprising one or more or all of the following:
    0.1 to 0.15 weight percent carbon
    16 to 18 weight percent cobalt,
    7.5 to 9.5 percent weight percent nickel,
    about 3.5 weight percent chromium,
    1.0 to 2.0 weight percent molybdenum,
    up to 0.25 weight percent tungsten,
    up to 0.02 weight percent vanadium;
    with the balance being iron.

15. Method according to claim 1, wherein the acid based liquid chemical solution comprises:
   0.6 to 10.5 v/v % of oxalic acid;
   0.0003 to 1.0 v/v % of sodium thiocyanate;
   0 to 3.0 v/v % of sodium metal nitrobenzene sulfonate (SMNBS);
   0.0001 to 0.5 v/v % of a surfactant;
and the balance being water.

16. Method according to claim 1, wherein the acid based liquid chemical solution comprises:
   0.8 to 1.2 v/v % of oxalic acid;
   0.0005 to 0.002 v/v % of sodium thiocyanate;
   0 to 0.02 v/v % of SMNBS;
   0.0005 to 0.02 v/v % of the surfactant;
and the balance being water.

* * * * *